US012805508B2

(12) United States Patent
Blaylock et al.

(10) Patent No.: US 12,805,508 B2
(45) Date of Patent: Nov. 24, 2026

(54) SELF-PROPELLED AGRICULTURAL SPRAYING EQUIPMENT BOOM LEVEL CONTROL SYSTEM

(71) Applicants: Deere & Company, Moline, IL (US); Iowa State University Research Foundation, Inc., Ames, IA (US)

(72) Inventors: Kyle R. Blaylock, Bondurant, IA (US); Robert McNaull, Ames, IA (US); Adam D. Sporrer, Huxley, IA (US); Bryan N. Hrnicek, Clarion, IA (US); Kasey J. Lammers, Clarion, IA (US); Daniel K. Murray, Clarion, IA (US); Alex J. Irlbeck, Templeton, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 133 days.

(21) Appl. No.: 18/906,438

(22) Filed: Oct. 4, 2024

(65) Prior Publication Data

US 2025/0134089 A1 May 1, 2025

Related U.S. Application Data

(60) Provisional application No. 63/594,993, filed on Nov. 1, 2023.

(51) Int. Cl.
*A01M 7/00* (2006.01)

(52) U.S. Cl.
CPC ......... *A01M 7/0057* (2013.01); *A01M 7/0042* (2013.01)

(58) Field of Classification Search
None
See application file for complete search history.

(56) References Cited

U.S. PATENT DOCUMENTS

| | | | | |
|---|---|---|---|---|
| 7,753,385 B2 * | 7/2010 | Bitter | B60G 21/073 280/124.161 |
| 7,877,884 B2 * | 2/2011 | Harrill | B60G 9/003 33/203.18 |

(Continued)

FOREIGN PATENT DOCUMENTS

| | | | |
|---|---|---|---|
| DE | 102019127301 | A1 | 4/2021 |
| EP | 3466257 | A1 | 4/2019 |

(Continued)

OTHER PUBLICATIONS

Extended European Search Report and Written Opinion issued in European Patent Application No. 24207285.8 dated Apr. 2, 2025, in 08 pages.

*Primary Examiner* — Hunter B Lonsberry
*Assistant Examiner* — Robert L Pinkerton
(74) *Attorney, Agent, or Firm* — Tucker Ellis LLP

(57) ABSTRACT

Methods and systems are provided for controlling the level relative to ground of moveable wings in a spray system that includes the moveable wings mounted to a common center frame support structure attached to an associated work vehicle to form a pair of opposed independently moveable wings extending laterally from the associated work vehicle. An initial control signal is determined for moving the moveable wings based on positions of the moveable wings relative to the ground. A compensating signal is determined for compensating the initial control signal, wherein the compensating signal is derived independent from the position of the moveable wings relative to the ground and includes a flexure component dependent upon one or more flexural properties of the associated work vehicle. A level control output signal is generated for controlling the level of the moveable wings based on a combination of the initial control signal and the compensating signal.

20 Claims, 10 Drawing Sheets

(56) References Cited

U.S. PATENT DOCUMENTS

| | | | | |
|---|---|---|---|---|
| 9,226,490 | B2 | 1/2016 | Keye | |
| 9,763,437 | B2 * | 9/2017 | Schnaider | A01M 7/0075 |
| 11,793,186 | B2 * | 10/2023 | Hirthammer | A01M 7/0071 |
| 2015/0367704 | A1 * | 12/2015 | Chua | B60G 17/033 280/6.157 |
| 2017/0102063 | A1 * | 4/2017 | Versteyhe | F02B 75/06 |
| 2019/0126912 | A1 * | 5/2019 | Peterson | A01B 63/22 |
| 2021/0007345 | A1 * | 1/2021 | Bartlett | A01M 7/0078 |
| 2022/0211027 | A1 * | 7/2022 | Van Poucke | A01B 79/005 |

FOREIGN PATENT DOCUMENTS

| | | | |
|---|---|---|---|
| EP | 2835050 | B1 | 10/2020 |
| EP | 3007553 | B2 | 12/2022 |

* cited by examiner

SELF-PROPELLED AGRICULTURAL SPRAYING EQUIPMENT BOOM LEVEL CONTROL SYSTEM

CROSS-REFERENCE TO RELATED APPLICATIONS

The present application is based on and claims the benefit of U.S. Provisional Patent application Ser. No. 63/594,993, filed Nov. 1, 2023, entitled SELF-PROPELLED AGRICULTURAL SPRAYING EQUIPMENT BOOM LEVEL CONTROL SYSTEM, the contents of which is hereby incorporated by reference herein in its entirety.

FIELD OF THE DISCLOSURE

This disclosure relates to systems and methods for controlling the level of agricultural spraying equipment booms.

BACKGROUND

Vehicle mounted spray systems incorporating a boom having arms that extend laterally from both sides of a vehicle such as a tractor are commonly used to spray agricultural crops with liquid based products such as fertilizers or other chemicals. Typically, these spray systems are mounted to the front or rear of the vehicle which will also carry a tank containing the liquid that is to be sprayed. To ensure that the correct amount of liquid is sprayed, the spray system is configured so that a given flow rate is dispensed from a plurality of sprayers located along the lateral arms. Often these vehicle mounted spray systems will incorporate a height adjustment capability to allow the overall height of the boom to be adjusted as desired in order that the boom may be maintained at a predetermined desired height above the surface to be sprayed. Booms vary in size, with typical wing tip to wing tip lengths being 90 feet (27 m), 120 feet (37 m) and 150 feet (46 m).

Simple height adjustment of the boom arms relative to the vehicle is sometimes insufficient such as for example in situations where the surface to be sprayed is undulating or sloped wherein the ground to the right of the vehicle may be elevated with respect the ground surface to the left of the vehicle. Throughout the specification when referring to a side of the vehicle this is defined in accordance with a view taken towards the front of the vehicle. To overcome this problem, the boom is oftentimes divided into separate articulated arms or wings, each of which being made to be independently adjustable by various means such as through use of hydraulic rams that function to raise or lower the arms independently in accordance with control signals provided by distance sensors located on each wing. These distance sensors typically measure the distance between the wing and the ground surface under the wing. In this manner, the left and right wings of the boom may be separately automatically raised or lowered as required.

There are a number of disadvantages with this approach, however. As noted, the wings extend for relatively large distances (27-46 m) from the vehicle, and they are often mounted to a central rigid support structure such as a fixed rigid center frame which itself is rigidly mounted to the vehicle. Therefore, any elevational movement of the vehicle relative to the ground results in an amplified elevational movement of the wings particularly at the ends of the wings.

Another disadvantage with this approach is that neither the vehicle nor spray system mounting hardware is truly rigid. Rather, there is some flexibility of the vehicle and mounting system ensemble. Both the vehicle and the mounting hardware introduce non-linearities such as for example flex-type dynamics and the like into the control system that is otherwise designed to maintain the boom wings at their respective predetermined desired heights above the surface to be sprayed.

Unfortunately, an effect of these non-linearities and elevational movement amplification problematic issues is to greatly reduce the stability of the wing height control as, for example, raising and lowering the wings to compensate for the vehicle asymmetrically encountering local undulations in the surface such as one side of the vehicle scaling a rock or entering into a rut in the ground that causes the vehicle to rapidly change lateral slope angle. In extreme circumstances, this could cause the tip of a wing to impact the ground as the speed of response of the boom level control system is not rapid enough to prevent this from occurring. Even in the case where an impact due to the side of the vehicle scaling the rock or entering into the rut is avoided, the vehicle descending from the rock or exiting from the rut could similarly cause the tip of a wing to impact the ground as the speed of response of the boom level control system might not be rapid enough, once again resulting in a time of instability of the spray system.

What is needed is a vehicle mounted spray system capable of improved stability control that adjusts for the inherent flexibility of one or more of the vehicle and/or the spray system mounting equipment ensemble.

SUMMARY

The embodiments herein are directed to sprayer boom level control systems and methods.

An embodiment herein is directed to control of a boom level control system.

An embodiment herein is directed to a boom level control method.

The implementations described herein provide improved control systems and methods for controlling the level relative to ground of moveable wings in a spray system attached to a work vehicle by a mounting system that adjusts for the inherent flexibility of the vehicle.

The implementations described herein provide improved control systems and methods for controlling the level relative to ground of moveable wings in a spray system attached to a work vehicle by a mounting system that adjusts for the inherent flexibility of the spray system mounting equipment ensemble.

In accordance with an aspect, a boom level control method generates a signal for controlling the level relative to ground of moveable wings in a spray system mounted to a common center frame support structure attached to an associated work vehicle by determining an initial control signal to move the moveable wings based on positions of the moveable wings relative to the ground, and determining a compensating signal for compensating the initial control signal, wherein the compensating signal is derived independent from the position of the moveable wings relative to ground and includes a flexure component dependent upon one or more flexural properties of the associated work vehicle.

In accordance with an aspect, a boom level control system generates a signal for controlling the level relative to ground of moveable wings in a spray system mounted to a common center frame support structure attached to an associated work vehicle by determining an initial control signal to move the moveable wings based on positions of the moveable wings relative to the ground, and determining a compensating signal for compensating the initial control signal, wherein the compensating signal is derived independent from the position of the moveable wings relative to ground and includes a flexure component dependent upon one or more flexural properties of the associated work vehicle.

In accordance with an aspect, a boom level control method generates a signal for controlling the level relative to ground of moveable wings in a spray system mounted to a common center frame support structure attached to an associated work vehicle by determining an initial control signal to move the moveable wings based on positions of the moveable wings relative to the ground, and determining a compensating signal for compensating the initial control signal, wherein the compensating signal is derived independent from the position of the moveable wings relative to ground and includes a flexure component dependent upon one or more flexural properties of a mounting equipment ensemble mounting the spray system with the associated work vehicle.

In accordance with an aspect, a boom level control system generates a signal for controlling the level relative to ground of moveable wings in a spray system mounted to a common center frame support structure attached to an associated work vehicle by determining an initial control signal to move the moveable wings based on positions of the moveable wings relative to the ground, and determining a compensating signal for compensating the initial control signal, wherein the compensating signal is derived independent from the position of the moveable wings relative to ground and includes a flexure component dependent upon one or more flexural properties of a mounting equipment ensemble mounting the spray system with the associated work vehicle.

In accordance with an aspect, non-transitory computer readable medium is provided storing instructions that, when executed by at least one processor device, cause the at least one processor device to perform a method of controlling the level relative to ground of moveable wings in a spray system that includes the moveable wings mounted to a common center frame support structure attached to an associated work vehicle to form a pair of opposed independently moveable wings extending laterally from the associated work vehicle, wherein the method includes determining an initial control signal to move the moveable wings based on positions of the moveable wings relative to the ground, determining a compensating signal for the initial control signal, wherein the compensating signal is derived independently from the position of the moveable wings relative to the ground and includes a flexure component dependent upon one or more flexural properties of the associated work vehicle, generating a level control output signal for controlling the level of the moveable wings based on a combination of the initial control signal and the compensating signal, and using the level control output signal to control the level of the moveable wings.

In any of the implementations, the properties of the associated work vehicle used for deriving the compensating signal may relate to inherent flexibility properties of the associated work vehicle.

In any of the implementations, the properties of the associated work vehicle used for deriving the compensating signal may relate to inherent flexibility properties of the associated work vehicle between a chassis of the work vehicle and a center frame support structure supporting the spray system boom on the work vehicle.

In any of the implementations, the properties of the associated work vehicle used for deriving the compensating signal may relate to inherent flexibility properties of a lift arm mounting arrangement that supports the spray system boom on the work vehicle.

In any of the implementations, the properties of the associated work vehicle used for deriving the compensating signal may relate to inherent flexibility properties of the associated work vehicle between an axle of the work vehicle and a center frame support structure supporting the spray system boom on the work vehicle.

In any of the implementations, the determining the initial control signal includes generating a first distance signal using a first distance sensor disposed on the first wing of the spray system, wherein the first distance signal is representative of a first distance between the first wing and the ground, generating a second distance signal using a second distance sensor disposed on the second wing of the spray system, wherein the second distance signal is representative of a second distance between the second wing and the ground, and determining the initial control signal based on a combination of the first and second distance signals, and the determining the compensating signal includes generating a center frame angle measurement signal using a first angle measuring device disposed on the center frame support structure, wherein the center frame angle measurement signal is representative of an angle of the center frame support structure relative to a level condition of the center frame support structure, generating a vehicle angle measurement signal using a second angle measuring device disposed on the associated work vehicle, wherein the vehicle angle measurement signal is representative of an angle of the associated work vehicle relative to a level condition of the associated work vehicle, determining the compensating signal based on a combination of the center frame angle measurement signal and the vehicle angle measurement signal.

In any of the implementations, the generating the vehicle angle measurement signal includes generating a chassis angle measurement signal using a chassis angle measurement device disposed on a chassis of the associated work vehicle, wherein the vehicle angle measurement signal is representative of an angle of the chassis of the associated work vehicle relative to a level condition of the chassis of the associated work vehicle, and the determining the compensating signal includes determining the compensating signal based on a combination of the center frame angle measurement signal and the chassis angle measurement signal.

In any of the implementations, the method further includes determining a rate of chassis angle change based on a rate of change of the chassis angle measurement signal, and determining a rate of center frame angle change based on a rate of change of the center frame angle measurement signal, wherein the determining the compensating signal includes comprises determining the compensating signal based on a combination of the rate of chassis angle change and the rate of center frame angle change.

In any of the implementations, the method further includes determining a lift arm flex value based on a difference between the chassis angle measurement signal and the center frame angle measurement signal, wherein the lift arm flex value is representative of amount of inherent flex in a lift arm mounting arrangement coupling the center frame support structure with the associated work vehicle, wherein the determining the compensating signal includes determining the compensating signal based on a combination of the rate of chassis angle change, the rate of center frame angle change, and the determined lift arm flex value.

In any of the implementations, the method further includes determining a lift arm flex rate of change based on a rate of change of the determined lift arm flex value, wherein the determining the compensating signal includes determining the compensating signal based on a combination of the rate of chassis angle change, the rate of center frame angle change, the determined lift arm flex value, and the determined lift arm flex rate of change.

In any of the implementations, the generating the vehicle angle measurement signal includes generating an axle angle measurement signal using an axle angle measurement device disposed on an axle of the associated work vehicle, wherein the axle angle measurement signal is representative of an angle of the axle of the associated work vehicle relative to a level condition of the axle of the associated work vehicle, and the determining the compensating signal includes determining the compensating signal based on a combination of the center frame angle measurement signal and the axle angle measurement signal.

In any of the implementations, the method further includes determining a rate of axle angle change based on a rate of change of the axle angle measurement signal, and determining a rate of center frame angle change based on a rate of change of the center frame angle measurement signal, wherein the determining the compensating signal includes determining the compensating signal based on a combination of the rate of axle angle change and the rate of center frame angle change.

In any of the implementations, the method further includes determining a chassis flex value based on a difference between the angle of the axle of the associated work vehicle and the angle of the center frame support structure, wherein the chassis flex value is representative of an amount of inherent flex in the associated vehicle between the axle of the associated work vehicle and the center frame support structure, wherein the determining the compensating signal comprises determining the compensating signal based on a combination of the rate of axle angle change, the rate of center frame angle change, and the determined chassis flex value.

In any of the implementations, the method further includes determining a chassis flex rate of change based on a rate of change of the determined chassis flex value, wherein the determining the compensating signal comprises determining the compensating signal based on a combination of the rate of axle angle change, the rate of center frame angle change, the determined chassis flex value, and the determined chassis flex rate of change.

In any of the implementations, the method further includes using the level control output signal to control the level of the moveable wings.

In any of the implementations, the system further includes a first distance sensor disposed on the first wing of the spray system, the first distance sensor being operable to generate a first distance signal representative of a distance between the first wing and the ground, a second distance sensor disposed on the second wing of the spray system, the second distance sensor being operable to generate a second distance signal representative of a distance between the second wing and the ground, a first angle measuring device disposed on the center frame support structure, the first angle measuring device being operable to generate a center frame angle measurement signal that is representative of an angle of the center frame support structure relative to a level condition of the center frame support structure, and a second angle measuring device disposed at a selected position on the associated work vehicle, the second angle measuring device being operable to generate a vehicle angle measurement signal that is representative of an angle of the associated work vehicle relative to a level condition of the associated work vehicle, wherein the processor device is operable to execute the sprayer boom level control logic to determine the initial control signal based on a combination of the first and second distance signals, wherein the processor device is operable to execute the sprayer boom level control logic to determine the compensating signal based on a combination of the center frame angle measurement signal and the vehicle angle measurement signal.

In any of the implementations, the system further includes a chassis angle measurement device disposed on a chassis of the associated work vehicle, the chassis angle measurement device being operable to generate a chassis angle measurement signal as the vehicle angle measurement signal, wherein the chassis angle measurement signal is representative of an angle of the chassis of the associated work vehicle relative to a level condition of the chassis of the associated work vehicle, wherein the processor device is operable to execute the sprayer boom level control logic to determine the compensating signal based on a combination of the center frame angle measurement signal and the chassis angle measurement signal.

In any of the implementations, the processor device of the system is operable to execute the sprayer boom level control logic to determine a rate of chassis angle change based on a rate of change of the chassis angle measurement signal, determine a rate of center frame angle change based on a rate of change of the center frame angle measurement signal, and determine the compensating signal based on a combination of the rate of chassis angle change and the rate of center frame angle change.

In any of the implementations, the processor device of the system is operable to execute the sprayer boom level control logic to determine a lift arm flex value based on a difference between the chassis angle measurement signal and the center frame angle measurement signal, wherein the lift arm flex value is representative of amount of inherent flex in a lift arm mounting arrangement coupling the center frame support structure with the associated work vehicle, and determine the compensating signal based on a combination of the rate of chassis angle change, the rate of center frame angle change, and the determined lift arm flex value.

In any of the implementations, the processor device of the system is operable to execute the sprayer boom level control logic to determine a lift arm flex rate of change based on a rate of change of the determined lift arm flex value, and determine the compensating signal based on a combination of the rate of chassis angle change, the rate of center frame angle change, the determined lift arm flex value, and the determined lift arm flex rate of change.

In any of the implementations, the system further includes an axle angle measurement device disposed on an axle of the associated work vehicle, wherein the axle angle measurement device is operable to generate an axle angle measurement signal as the vehicle angle measurement signal, wherein the axle angle measurement signal is representative of an angle of the axle of the associated work vehicle relative to a level condition of the axle of the associated work vehicle, wherein the processor device is operable to execute the sprayer boom level control logic to determine the compensating signal based on a combination of the center frame angle measurement signal and the axle angle measurement signal.

In any of the implementations, the processor device of the system is operable to execute the sprayer boom level control logic to determine a rate of axle angle change based on a rate of change of the axle angle measurement signal, determine a rate of center frame angle change based on a rate of change of the center frame angle measurement signal, and determine the compensating signal based on a combination of the rate of axle angle change and the rate of center frame angle change.

In any of the implementations, the processor device of the system is operable to execute the sprayer boom level control logic to determine a chassis flex value based on a difference between the angle of the axle of the associated work vehicle and the angle of the center frame support structure, wherein the chassis flex value is representative of an amount of inherent flex in the associated vehicle between the axle of the associated work vehicle and the center frame support structure, and determine the compensating signal based on a combination of the rate of axle angle change, the rate of center frame angle change, and the determined chassis flex value.

In any of the implementations, the processor device of the system is operable to execute the sprayer boom level control logic to determine a chassis flex rate of change based on a rate of change of the determined chassis flex value, and determine the compensating signal based on a combination of the rate of axle angle change, the rate of center frame angle change, the determined chassis flex value, and the determined chassis flex rate of change.

BRIEF DESCRIPTION OF THE DRAWINGS

In the accompanying drawings which are incorporated in and constitute a part of the specification, implementations of the disclosure are illustrated, which, together with the general descriptions given above, and the detailed description given below, serve to exemplify the implementations of this disclosure.

DETAILED DESCRIPTION

Figure 1A:
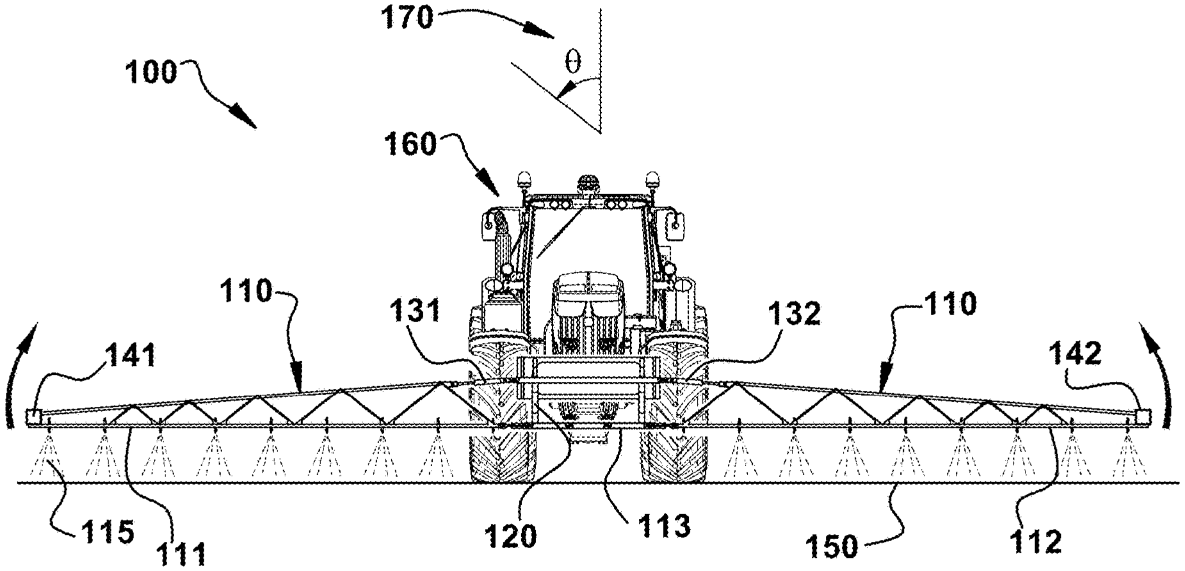
FIG. 1A is a rear elevational view of a vehicle mounted spray system according to an exemplary implementation of the present disclosure.

For promoting an understanding of the principles of the present disclosure, reference will now be made to the implementations described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Referring now to FIG. 1A, there is shown a vehicle mounted spray system 100 in accordance with an illustrative embodiment of the present disclosure. Vehicle mounted spray system 100 is mounted to a vehicle 160 which in this case is a tractor and includes a boom section 110 incorporating a pair of opposed wing sections 111, 112 mounted to a common center frame support structure 113 which in turn is mounted to the vehicle 160. It is to be appreciated that the common center frame support structure 113 may be mounted directly to the vehicle 160, or indirectly by an intermediate resilient lift arm mounting arrangement 120 as is known in the art.

Figure 1B:
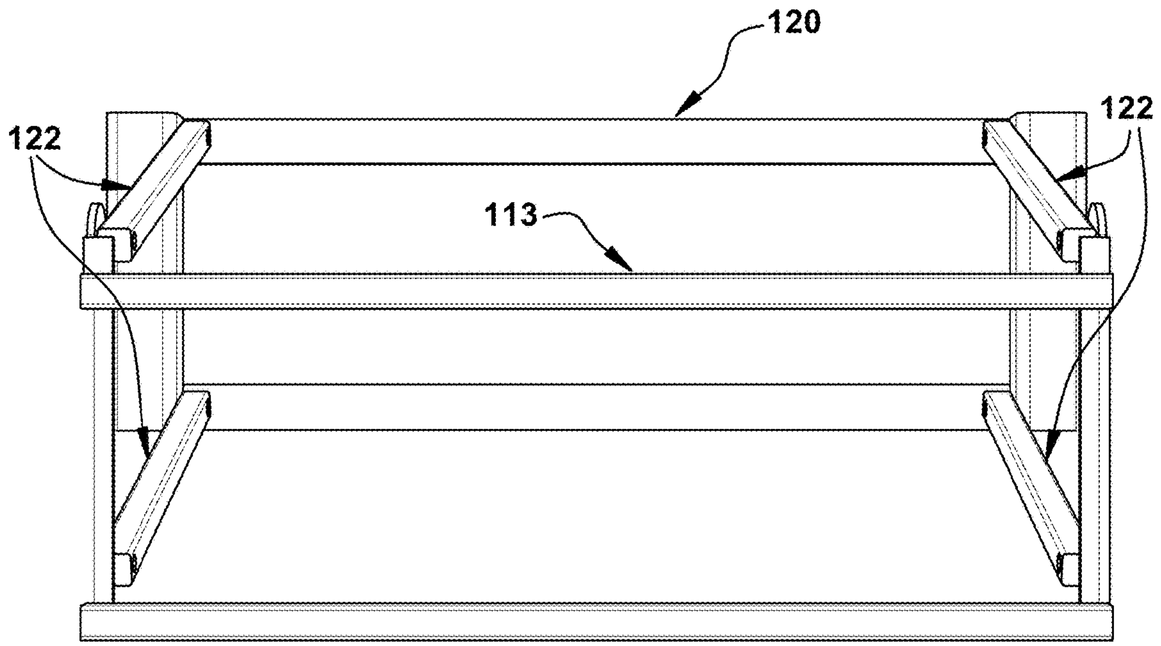
FIG. 1B is a representation of a resilient mounting arrangement in the form of a lift arm mounting arrangement for a boom section.

Referring now to FIGS. 1A and 1B, the lift arm mounting arrangement 120 includes a raising means, which allows the entire center frame support structure 113 and boom 110 to be raised to a predetermined height with respect to the tractor 160 while ensuring that spray nozzles 115 continue to point in a downward direction. The raising means utilizes hydraulic rams and may be via a parallelogram mechanical method as shown in FIG. 1B where the common center frame support structure 113 is raised by a series of parallel linkage arms 122 extending rearward and downwardly from the resilient lift arm mounting arrangement 120. Alternatively the raising means may be through the use of two vertically mounted guide tracks (not shown).

Each wing 111, 112 may be separately articulated by one or more corresponding hydraulic ram(s) 131, 132 (FIG. 1A) wherein only one (1) hydraulic ram each is shown for ease of reference, and which function to separately raise and lower each wing 111, 112 in accordance with control signals provided by the control system in accordance with implementations herein and to be described in greater detail below. Distance sensors 141, 142 are mounted at the tips of each wing 111, 112 and measure the positions or heights of the tips of each wing 111, 112. Alternatively one or more distance sensors may be mounted at other locations along a wing to provide position or height information at their respective position. These sensors allow the difference in the height of the wing tip relative to the center of the support structure to be calculated (i.e. the wing height error).

Figure 2:
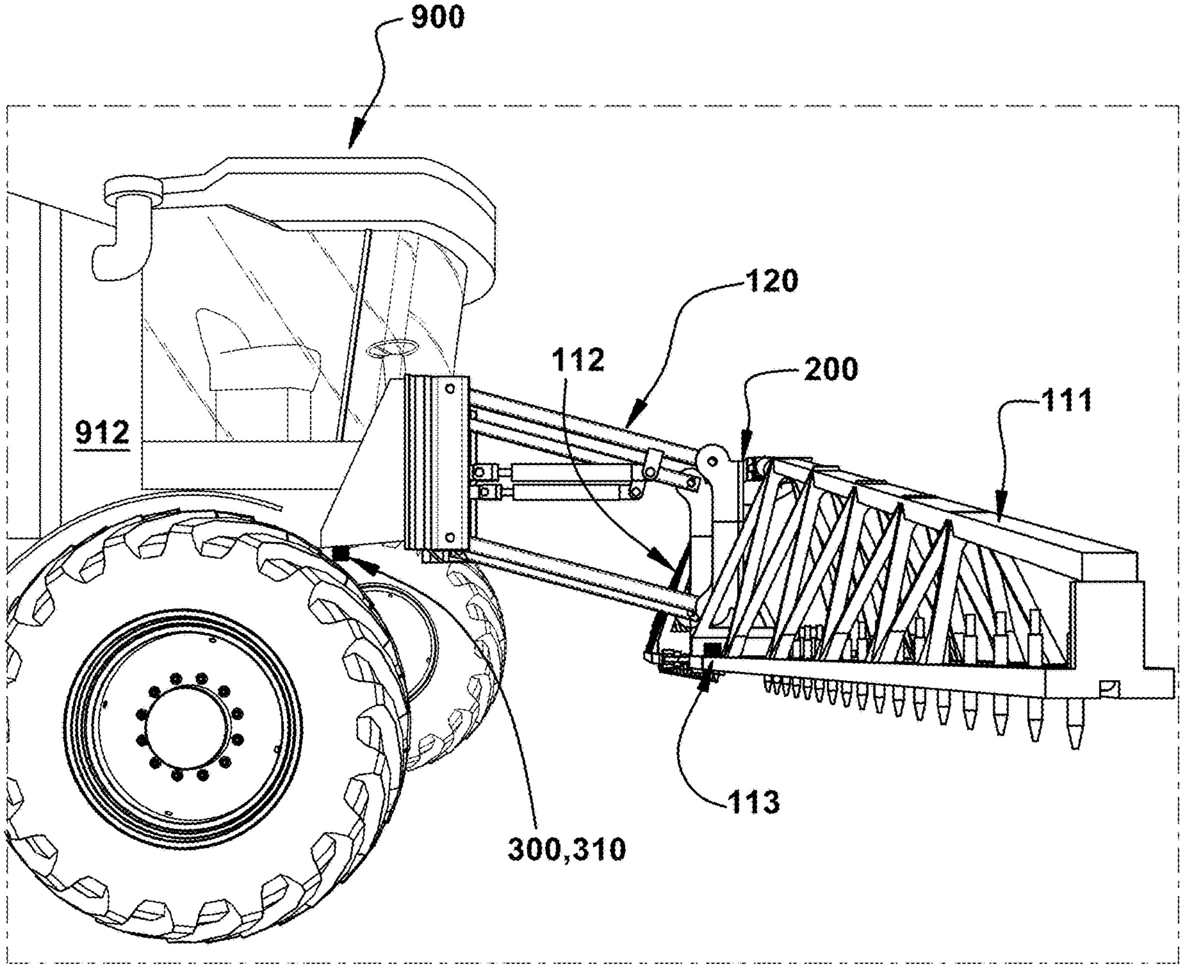
FIGS. 2, 3A, and 3B illustrate a boom level control system applied to an associated agricultural work vehicle according to an implementation of the present disclosure.
Figure 3A:
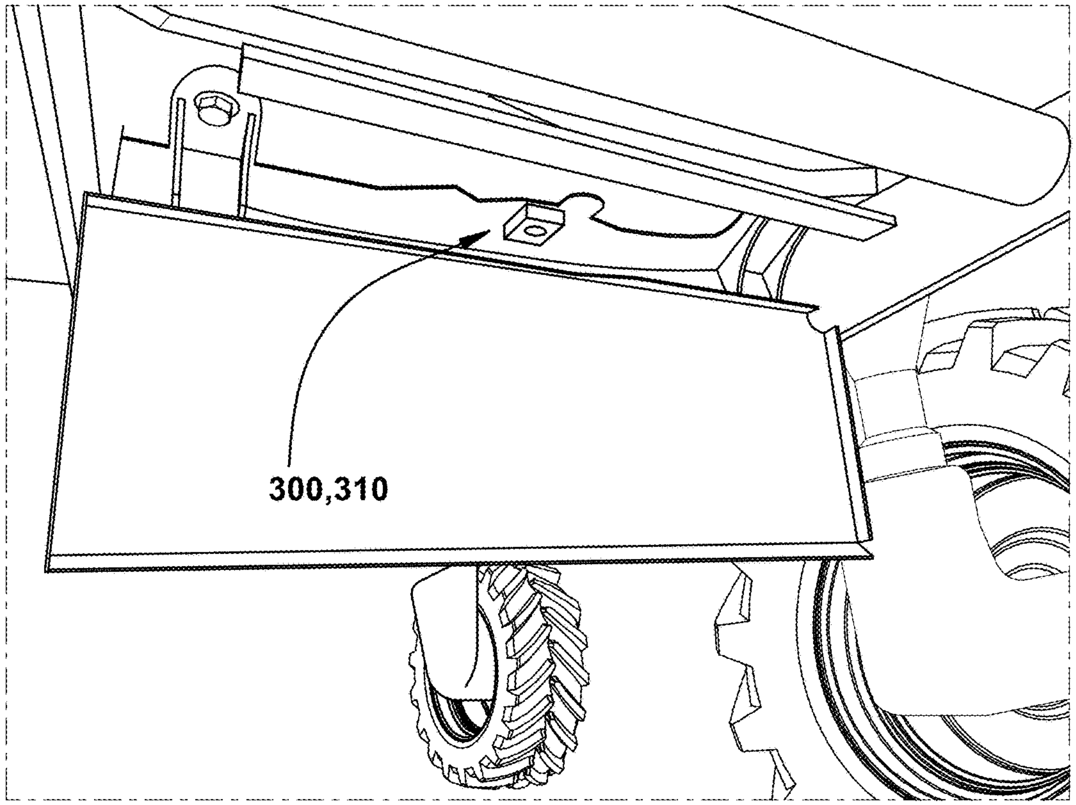
Figure 3B:
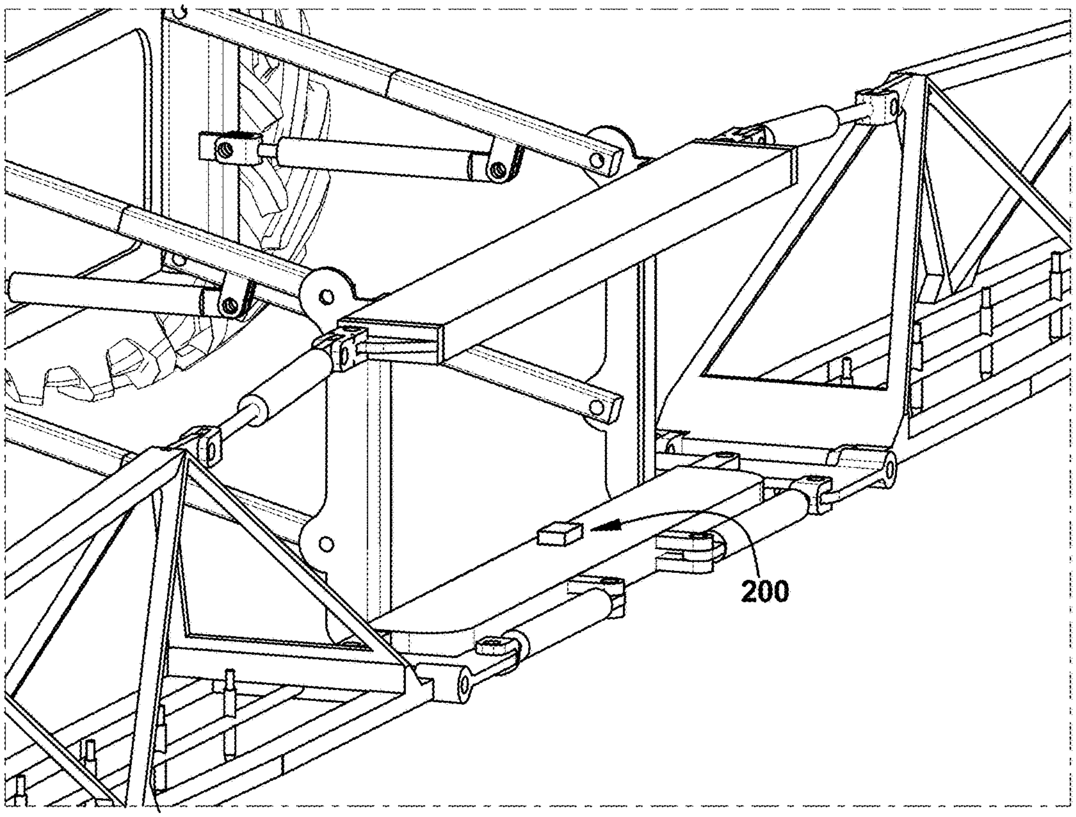
Figure 4A:
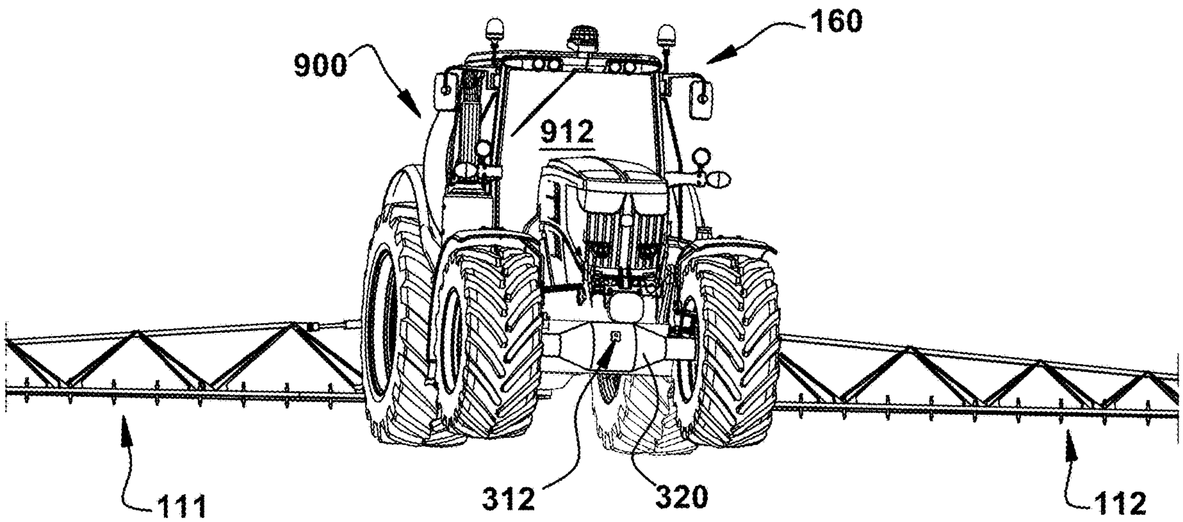
FIGS. 4A and 4B illustrate a boom level control system applied to an associated agricultural work vehicle according to an implementation of the present disclosure.
Figure 4B:
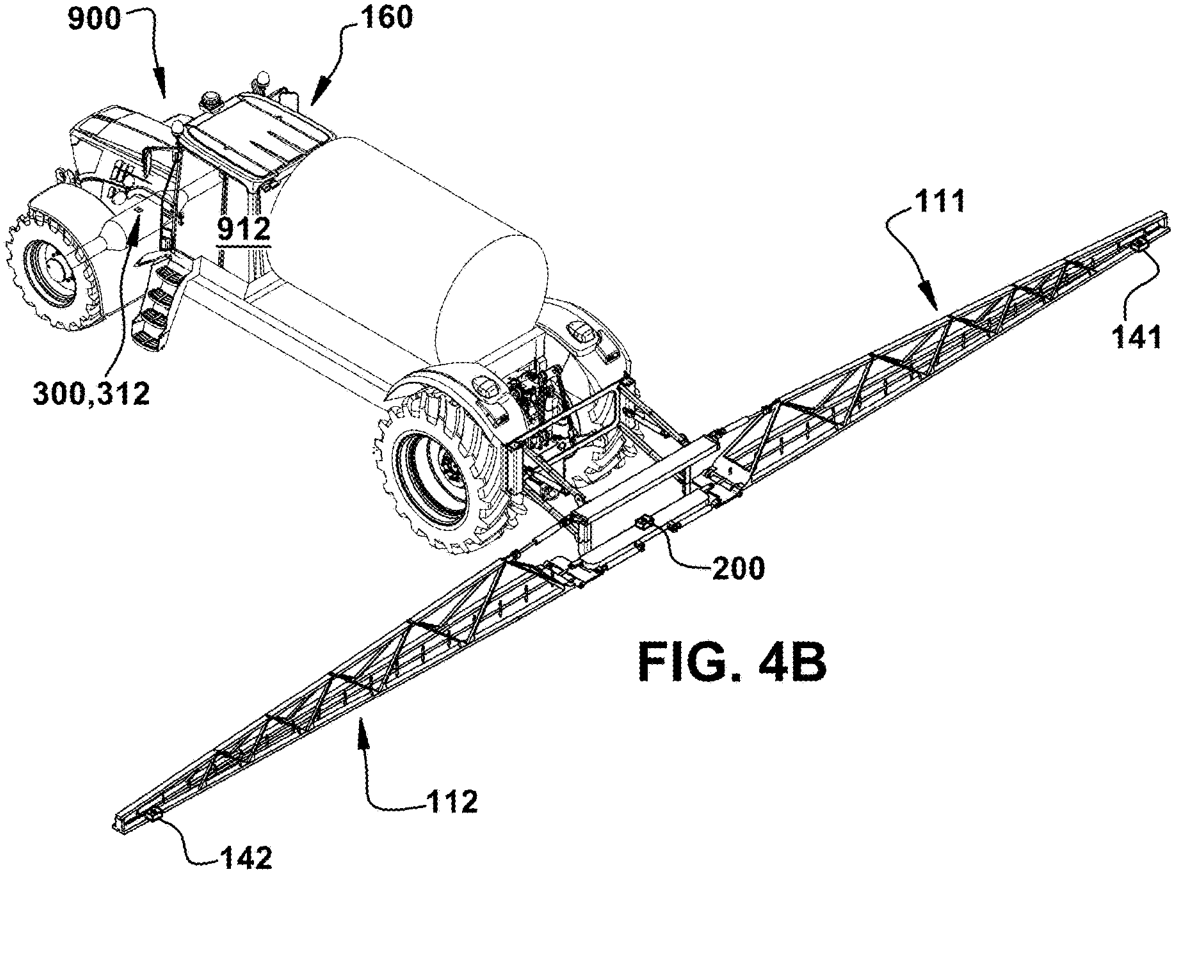
Figure 5A:
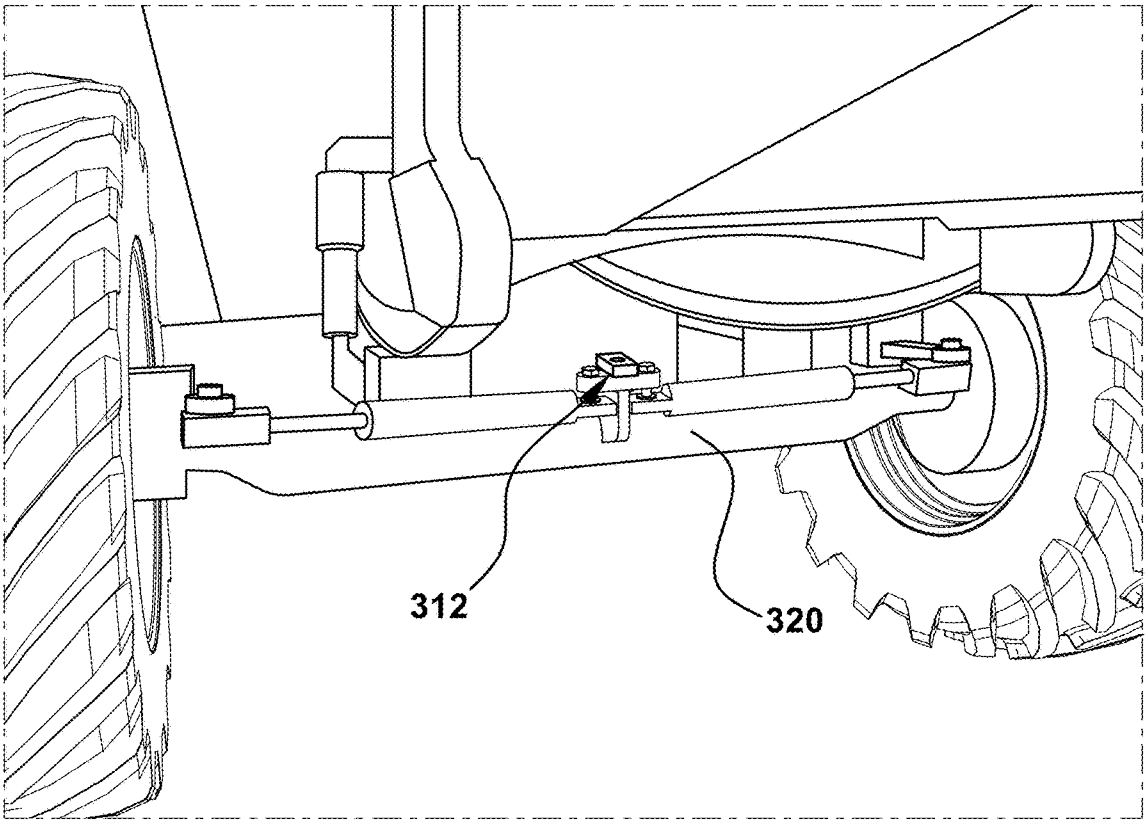
FIGS. 5A-5D illustrate a boom level control system applied to an associated agricultural work vehicle according to an implementation of the present disclosure.
Figure 5B:
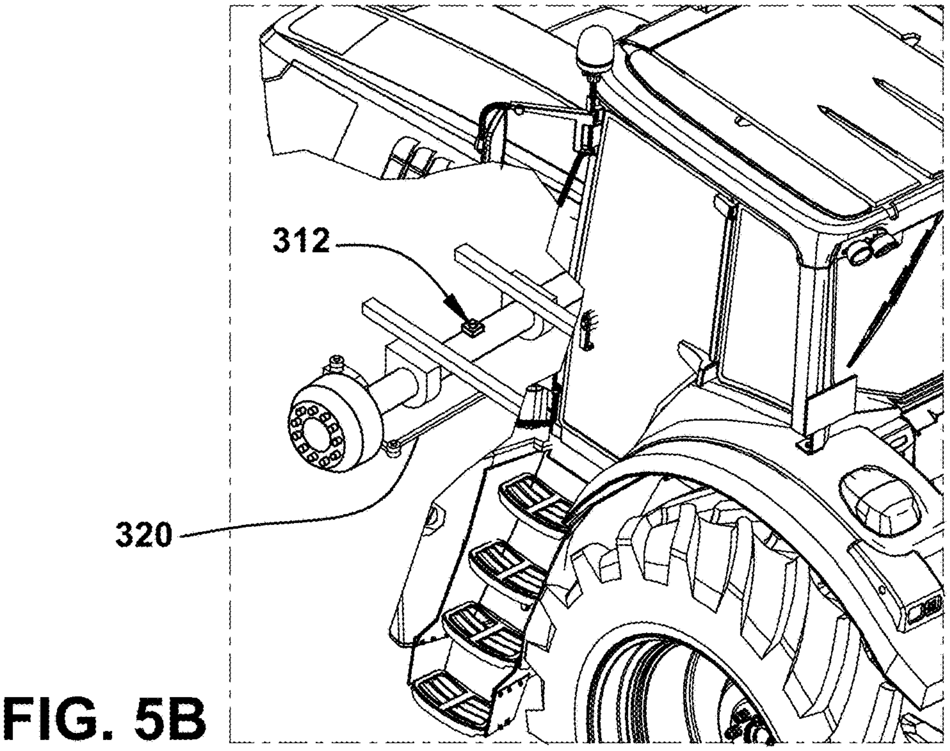
Figure 5C:
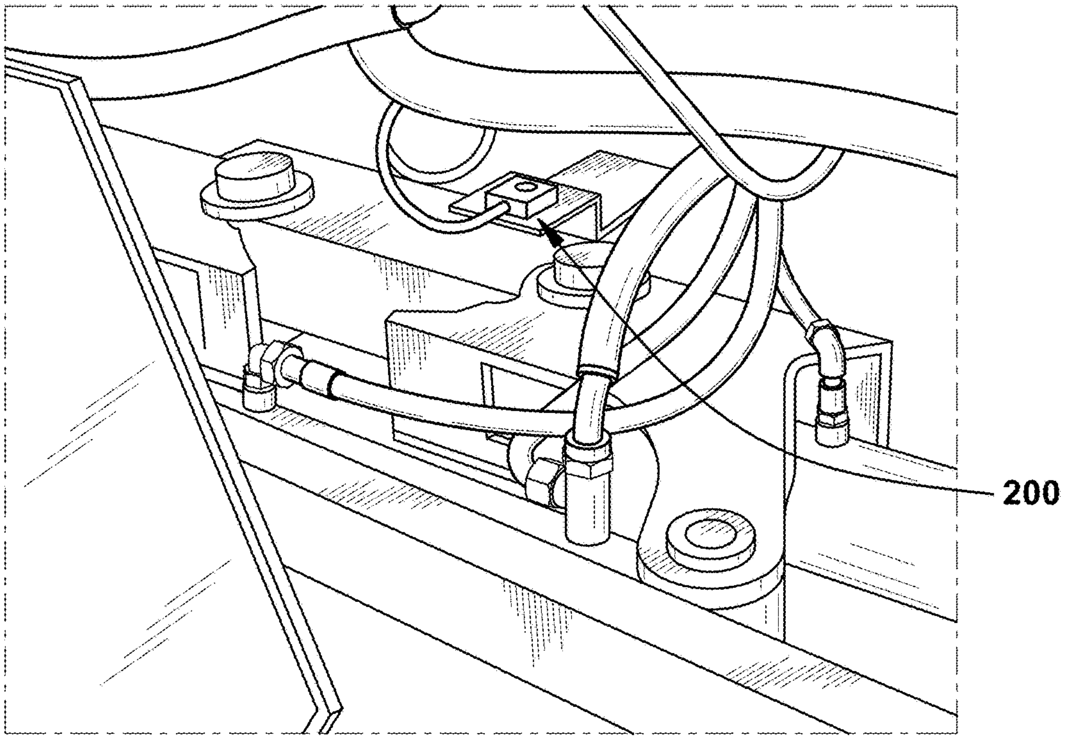
Figure 5D:
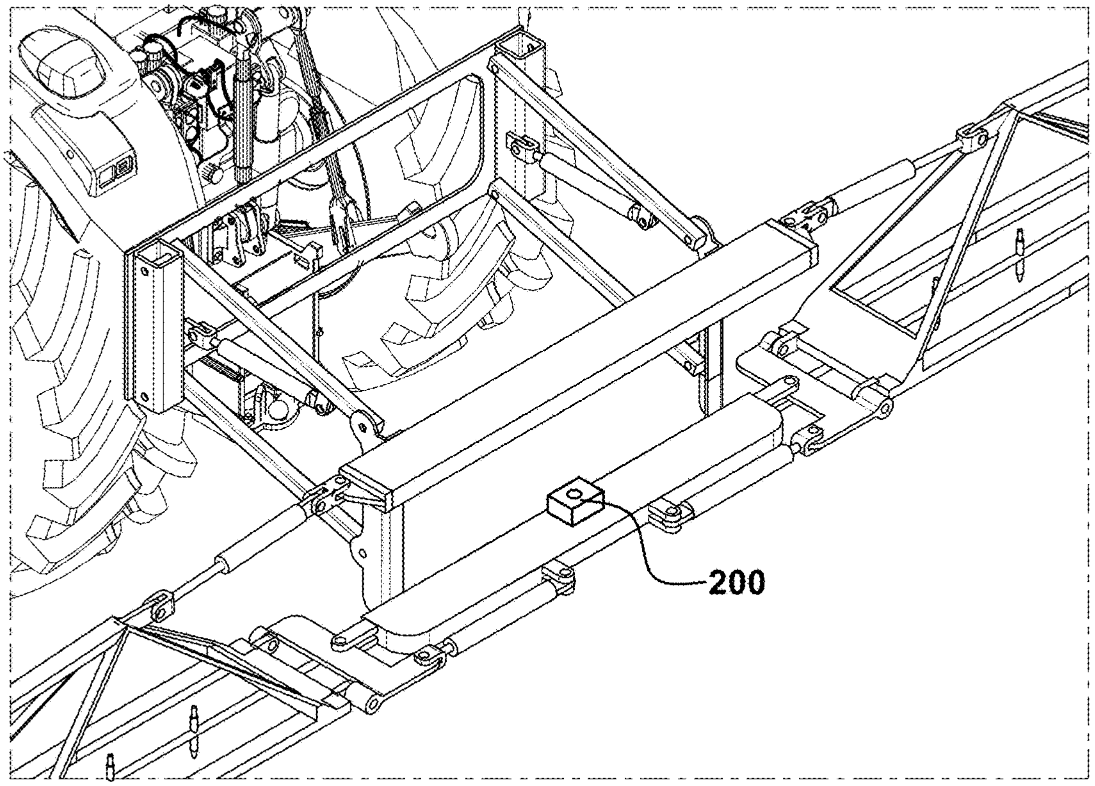

FIGS. 2, 3A, and 3B illustrate a boom level control system 900 applied to an associated agricultural work vehicle 160 according to an implementation of the present disclosure. With reference now to those Figures, the boom level control system 900 is configured to generate a signal for controlling the level relative to ground of moveable wings in a spray system 160 that includes the moveable wings 111, 112 mounted to a common center frame support structure 113 attached to the agricultural work vehicle 160 to form a pair of opposed independently moveable wings extending laterally from the vehicle. The control system 900 includes a control unit 912 (FIG. 9) that is operable to control the level of the moveable wings relative to the ground by determining an initial control signal 620 (FIG. 7) to move the moveable wings based on positions of the moveable wings relative to the ground, determining a compensating signal 640 (FIG. 7) for compensating the initial control signal wherein the compensating signal is derived independent from the position of the moveable wings relative to ground and includes a flexure component dependent upon one or more flexural properties of the associated work vehicle, and generating a level control output signal 690 (FIG. 7) for controlling the level of the moveable wings based on a combination of the initial control signal and the compensating signal.

In accordance with the implementation of FIGS. 2, 3A, and 3B, the boom level control system 900 determines the initial control signal by generating 612 (FIG. 7) a first distance signal using a first distance sensor 141 disposed on the first wing 111 of the spray system 160 and generating 614 (FIG. 7) a second distance signal using a second distance sensor 142 disposed on the second wing 112 of the spray system 160. It is to be appreciated that the first distance signal is representative of a first distance between the first wing and the ground, and that the second distance signal is representative of a second distance between the second wing and the ground. The boom level control system 900 then determines the initial control signal based on a combination of the first and second distance signals. The first and second distance sensors 141, 142 may be ultrasonic distance sensors, for example.

Figure 7:
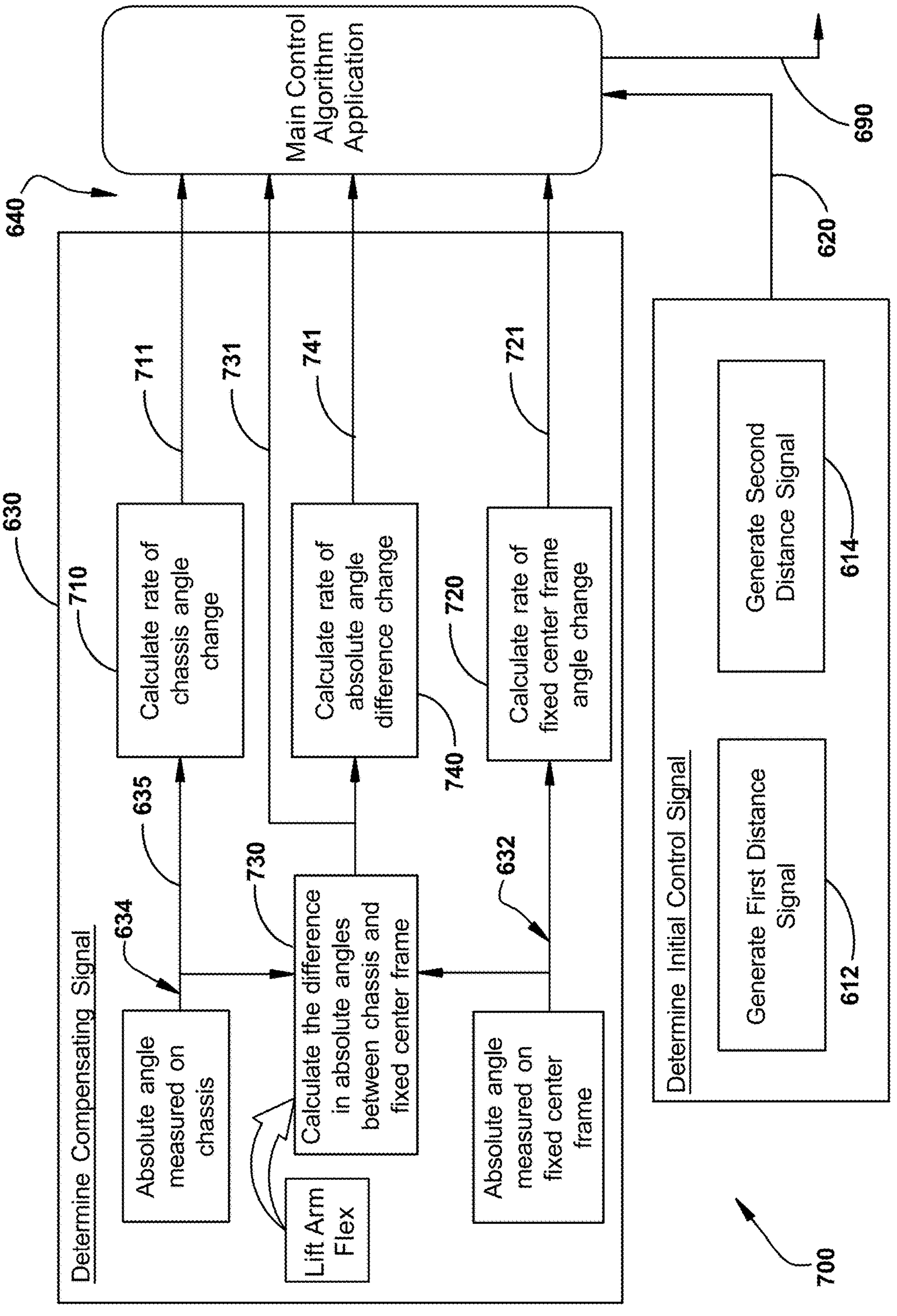
FIG. 7 is a functional flow diagram illustrating a functional flow of a method for controlling the level relative to ground of moveable wings in the spray system carried on the work vehicle of FIGS. 2, 3A, and 3B according to an implementation of the present disclosure.

Further in accordance with the implementation of FIGS. 2, 3A, and 3B, the boom level control system 900 determines the compensating signal 640 (FIG. 7) by generating a center frame angle measurement signal 632 (FIG. 7) using a first angle measuring device 200 disposed on the center frame support structure 113, wherein the center frame angle measurement signal is representative of an angle of the center frame support structure relative to a level condition of the center frame support structure, and by generating a vehicle angle measurement signal 634 (FIG. 7) using a second angle measuring device 300 disposed on the associated work vehicle, wherein the vehicle angle measurement signal is representative of an angle of the associated agricultural work vehicle 160 relative to a level condition of the associated work vehicle, wherein the compensating signal 640 (FIG. 7) is determined based on a combination of the center frame angle measurement signal 632 (FIG. 7) and the vehicle angle measurement signal 634 (FIG. 7).

In accordance with the implementation of FIGS. 2, 3A, and 3B, the second angle measuring device 300 disposed on the associated work vehicle may include one or more ultrasonic sensors, pitch sensors, tilt sensors, roll angle sensors, global positioning system (GPS) sensors, speed sensors, angle sensors, and inertial measurement unit (IMU) sensors, but can include any other sensor that can determine a state of one or more properties of the associated agricultural work vehicle 160.

In particular with regard to the implementation of FIGS. 2, 3A, and 3B, the second angle measuring device 300 disposed on the associated work vehicle is a chassis angle measurement device 310 disposed on a chassis of the associated work vehicle. The chassis angle measurement device 310 generates a chassis angle measurement signal 635 (FIG. 7) that is representative of an angle of the chassis of the associated work vehicle 160 relative to a level condition of the chassis of the associated work vehicle. The boom level control system 900 then determines the compensating signal 640 (FIG. 7) based on a combination of the center frame angle measurement signal 632 (FIG. 7) and the chassis angle measurement signal 635 (FIG. 7).

FIGS. 4A, 4B, and 5A-5D illustrate a boom level control system applied to an associated agricultural work vehicle according to an implementation of the present disclosure. With reference now to those Figures, the boom level control system 900 is configured to generate a signal for controlling the level relative to ground of moveable wings in a spray system 160 that includes the moveable wings 111, 112 mounted to a common center frame support structure 113 attached to the agricultural work vehicle 160 to form a pair of opposed independently moveable wings extending laterally from the vehicle. The control system 900 includes a control unit 912 (FIG. 9) that is operable to control the level of the moveable wings relative to the ground by determining an initial control signal 620 (FIG. 8) to move the moveable wings based on positions of the moveable wings relative to the ground, determining a compensating signal 640 (FIG. 8) for compensating the initial control signal wherein the compensating signal is derived independent from the position of the moveable wings relative to the ground and includes a flexure component dependent upon one or more flexural properties of the associated work vehicle, and generating a level control output signal 690 (FIG. 8) for controlling the level of the moveable wings based on a combination of the initial control signal and the compensating signal.

In accordance with the implementation of FIGS. 4A, 4B, and 5A-5D, the boom level control system 900 determines the initial control signal by generating 612 (FIG. 8) a first distance signal using a first distance sensor 141 disposed on the first wing 111 of the spray system 160 and generating 614 (FIG. 8) a second distance signal using a second distance sensor 142 disposed on the second wing 112 of the spray system 160. It is to be appreciated that the first distance signal is representative of a first distance between the first wing and the ground, and that the second distance signal is representative of a second distance between the second wing and the ground. The boom level control system 900 then determines the initial control signal based on a combination of the first and second distance signals. The first and second distance sensors 141, 142 may be ultrasonic distance sensors, for example.

Figure 8:
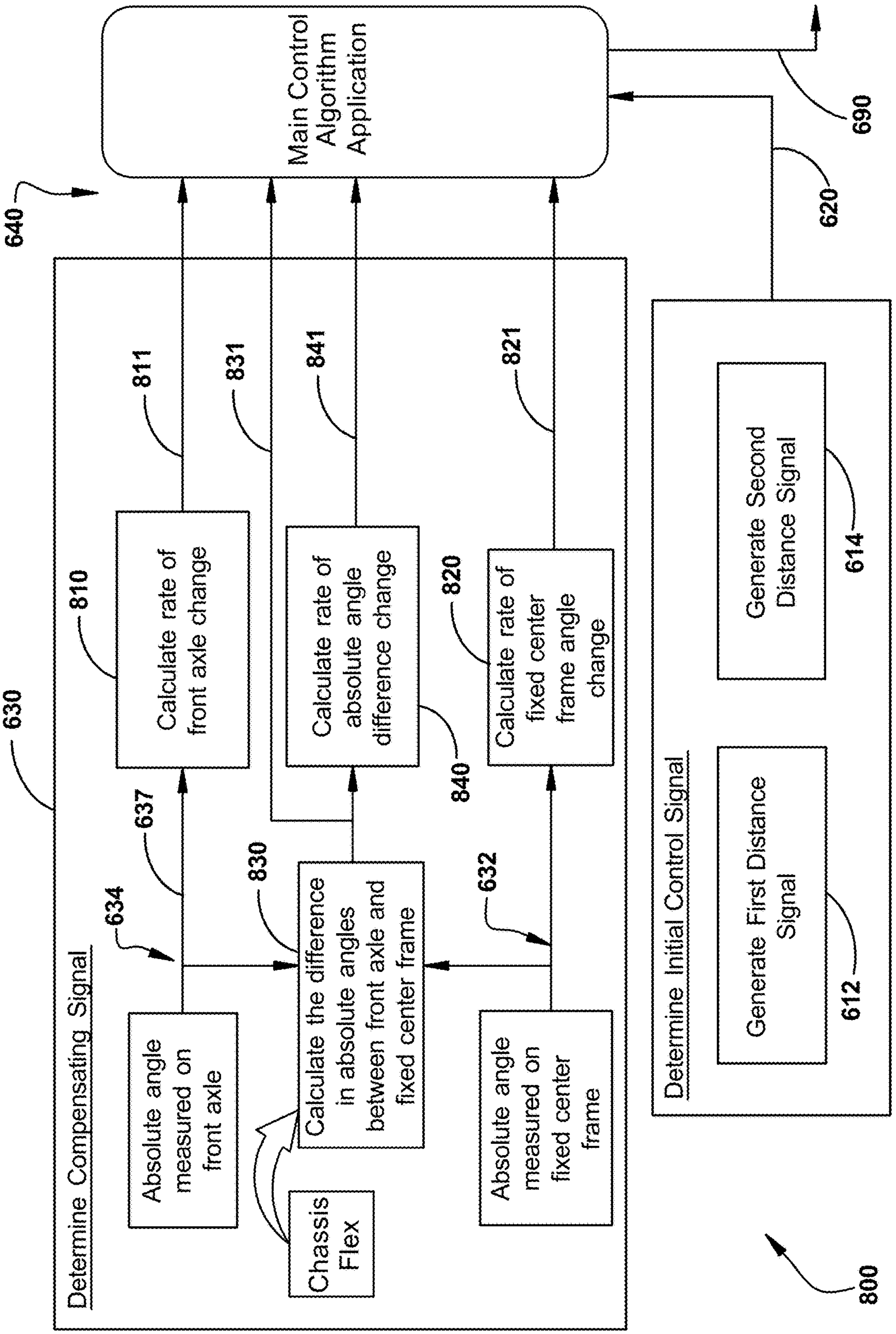
FIG. 8 is a functional flow diagram illustrating a functional flow of a method for controlling the level relative to ground of moveable wings in the spray system carried on the work vehicle of FIGS. 4A, 4B, and 5A-5D according to an implementation of the present disclosure.

Further in accordance with the implementation of FIGS. 4A, 4B, and 5A-5D, the boom level control system 900 determines the compensating signal 640 (FIG. 8) by generating a center frame angle measurement signal 632 (FIG. 8) using a first angle measuring device 200 disposed on the center frame support structure 113, wherein the center frame angle measurement signal is representative of an angle of the center frame support structure relative to a level condition of the center frame support structure, and by generating a vehicle angle measurement signal 634 (FIG. 8) using a second angle measuring device 300 disposed on the associated work vehicle, wherein the vehicle angle measurement signal is representative of an angle of the associated agricultural work vehicle 160 relative to a level condition of the associated work vehicle, wherein the compensating signal 640 (FIG. 8) is determined based on a combination of the center frame angle measurement signal 632 (FIG. 8) and the vehicle angle measurement signal 634 (FIG. 8).

In accordance with the implementation of FIGS. 4A, 4B, and 5A-5D, the second angle measuring device 300 disposed on the associated work vehicle may include one or more ultrasonic sensors, tilt sensors, roll angle sensors, global positioning system (GPS) sensors, speed sensors, angle sensors, and inertial measurement unit (IMU) sensors, but can include any other sensor that can determine a state of one or more properties of the associated agricultural work vehicle 160.

In particular with regard to the implementation of FIGS. 4A, 4B, and 5A-5D, the second angle measuring device 300 disposed on the associated work vehicle is an axle angle measurement device 312 disposed on an axle 130 of the associated work vehicle. The axle angle measurement device 312 generates an axle angle measurement signal 637 (FIG. 8) that is representative of an angle of the axle 130 of the associated work vehicle 160 relative to a level condition of the axle 130 of the associated work vehicle. The boom level control system 900 then determines the compensating signal 640 (FIG. 8) based on a combination of the center frame angle measurement signal 632 (FIG. 8) and the axle angle measurement signal 637 (FIG. 8).

Figure 6:
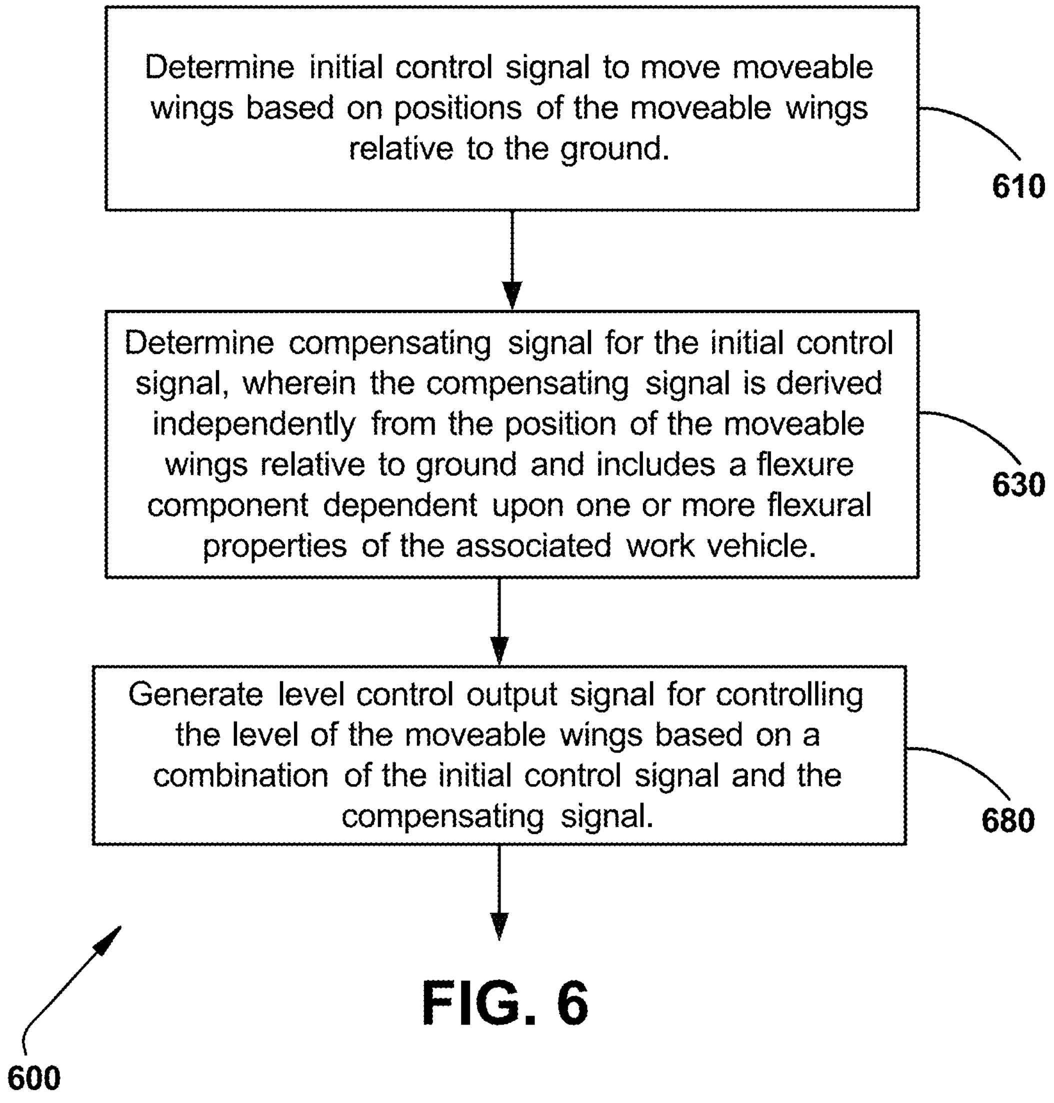
FIG. 6 is a flow diagram illustrating a method for controlling the level relative to ground of moveable wings in a spray system according to an implementation of the present disclosure.

FIG. 6 is a flow diagram illustrating a method 600 for controlling the level relative to ground of moveable wings in a spray system 100 that includes the moveable wings mounted to a common center frame support structure 113 attached to an associated work vehicle 160 to form a pair of opposed independently moveable wings 111, 112 extending laterally from the associated work vehicle. With reference now to that Figure together with FIGS. 7 and 8, the method 600 includes determining at 610 an initial control signal 620 (FIGS. 7 and 8) to move the moveable wings based on positions of the moveable wings relative to the ground. The method further includes determining at 630 a compensating signal 640 (FIGS. 7 and 8) for the initial control signal. In accordance with an implementation, the compensating signal is derived independent from the position of the moveable wings relative to the ground and includes a flexure component dependent upon one or more flexural properties of the associated work vehicle. The method 600 further includes generating at 680 a level control output signal 690 (FIGS. 7 and 8) for controlling the level of the moveable wings based on a combination of the initial control signal 620 and the compensating signal 640.

Figure 9:
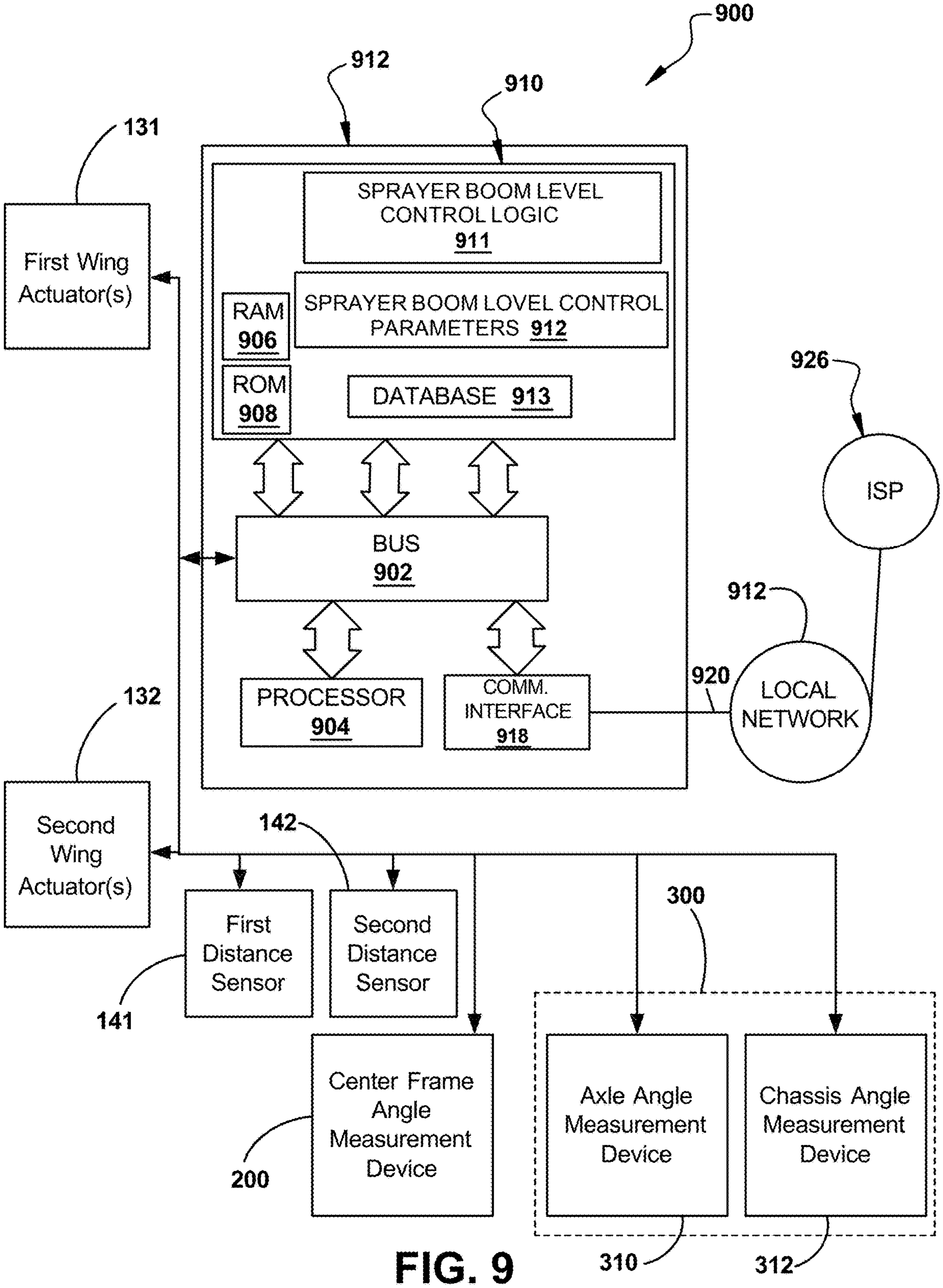
FIG. 9 is a block diagram that illustrates a boom level control system for controlling the level relative to ground of moveable wings in a spray system according to an implementation of the present disclosure.

With continued reference to FIG. 2 together with FIGS. 7, 8, and 9, it is to be appreciated that in accordance with an example implementation of the method 600, the method includes using the level control output signal 690 to control the level of the moveable wings 111, 112. That is, the method may include using the level control output signal 690 to actuate one or more hydraulic ram(s) 131, 132 (FIG. 1A) that function to separately raise and lower each wing 111, 112 in accordance with the control output signal 690 provided by the control system 900 (FIG. 9) herein.

In accordance with an implementation of the method 600, the determining 610 the initial control signal 620 may include generating 612 a first distance signal using a first distance sensor 141 disposed on the first wing 111 of the spray system 100, wherein the first distance signal is representative of a first distance between the first wing 111 and the ground. The determining 610 the initial control signal 620 may further include generating 614 a second distance signal using a second distance sensor 142 disposed on the second wing 112 of the spray system 100, wherein the second distance signal is representative of a second distance between the second wing 112 and the ground. In this way the initial control signal 620 may be determined at 680 based on a combination of the first and second distance signals.

In accordance with an implementation of the method 600, the determining 630 the compensating signal 640 includes generating a center frame angle measurement signal 632 using a first angle measuring device 200 disposed on the center frame support structure 113, wherein the center frame angle measurement signal 632 is representative of an angle of the center frame support structure 113 relative to a level condition of the center frame support structure 113. The determining 630 the compensating signal 640 further includes generating a vehicle angle measurement signal 634 using a second angle measuring device 300 disposed on the associated work vehicle 160, wherein the vehicle angle measurement signal 634 is representative of an angle of the associated work vehicle 160 relative to a level condition of the associated work vehicle 160. In this way, the compensating signal 640 may be determined at 630 based on a combination of the center frame angle measurement signal 632 and the vehicle angle measurement signal 634.

In accordance with an implementation of the method 600, the generating the vehicle angle measurement signal 634 includes generating a chassis angle measurement signal 635 using a chassis angle measurement device 310 disposed on a chassis of the associated work vehicle 160. In the example implementation, the vehicle angle measurement signal 634 is representative of an angle of the chassis of the associated work vehicle 160 relative to a level condition of the chassis of the associated work vehicle 160. In this way the compensating signal 640 is determined at 630 based on a combination of the center frame angle measurement signal 632 and the chassis angle measurement signal 635.

In accordance with an implementation of the method 600, a rate of chassis angle change 711 is determined 710 based on a rate of change of the chassis angle measurement signal 635, and a rate of center frame angle change 721 is determined 720 based on a rate of change of the center frame angle measurement signal 632, wherein the determining at 630 the compensating signal 640 includes determining the compensating signal 640 based on a combination of the rate of chassis angle change 711 and the rate of center frame angle change 721.

In accordance with an implementation of the method 600, a lift arm flex value 731 is determined 730 based on a difference between the chassis angle measurement signal 635 and the center frame angle measurement signal 632, wherein the lift arm flex value 731 is representative of amount of inherent flex in a lift arm mounting arrangement 120 coupling the center frame support structure 113 with the associated work vehicle 160. In this way, the compensating signal 640 is determined at 630 based on a combination of the rate of chassis angle change 711, the rate of center frame angle change 721, and the determined lift arm flex value 731.

In accordance with an implementation of the method 600, a lift arm flex rate of change 741 is determined 740 based on a rate of change of the determined lift arm flex value 731. In this way, the compensating signal 640 is determined 630 based on a combination of the rate of chassis angle change 711, the rate of center frame angle change 721, the determined lift arm flex value 731, and the determined lift arm flex rate of change 741.

In accordance with an implementation of the method 600, an axle angle measurement signal 637 is generated using an axle angle measurement device 312 disposed on an axle 130 of the associated work vehicle 160, wherein the axle angle measurement signal 637 is representative of an angle of the axle 130 of the associated work vehicle 160 relative to a level condition of the axle 130 of the associated work vehicle. In this way, the compensating signal 640 is determined at 630 based on a combination of the center frame angle measurement signal 632 and the axle angle measurement signal 637.

In accordance with an implementation of the method 600, a rate of axle angle change 811 is determined 810 based on a rate of change of the axle angle measurement signal 637, and a rate of center frame angle change 821 is determined 820 based on a rate of change of the center frame angle measurement signal 632. In this way, the compensating signal 640 is determined at 630 based a combination of the rate of axle angle change 811 and the rate of center frame angle change 821.

In accordance with an implementation of the method 600, a chassis flex value 831 is determined 830 based on a difference between the angle of the axle 130 of the associated work vehicle 160 and the angle of the center frame support structure 113, wherein the chassis flex value 831 is representative of an amount of inherent flex in the associated vehicle 160 between the axle 130 of the associated work vehicle 160 and the center frame support structure 113. In this way, the compensating signal 640 is determined at 630 based a combination of the rate of axle angle change 811, the rate of center frame angle change 821, and the determined chassis flex value 831.

In accordance with an implementation of the method 600, a chassis flex rate of change 841 is determined 840 based on a rate of change of the determined chassis flex value 831. In this way, the compensating signal 640 is determined at 630 based a combination of the rate of axle angle change 811, the rate of center frame angle change 821, the determined chassis flex value 831, and the determined chassis flex rate of change 841.

FIG. 7 is a functional flow diagram 700 illustrating a functional flow of a method for controlling the level relative to ground of moveable wings in the spray system carried on the agricultural work vehicle 160 of FIGS. 2, 3A, and 3B according to an implementation of the present disclosure.

As described a center frame angle measurement signal 632 is generated using a first angle measuring device 200 disposed on the center frame support structure 113, wherein the center frame angle measurement signal is representative of an angle of the center frame support structure relative to a level condition of the center frame support structure. Also, a vehicle angle measurement signal 634 is generated using a second angle measuring device 300 disposed on the associated work vehicle, wherein the vehicle angle measurement signal is representative of an angle of the associated agricultural work vehicle 160 relative to a level condition of the associated work vehicle. The second angle measuring device 300 disposed on the associated work vehicle is in the example implementation a chassis angle measurement device 310 disposed on a chassis of the associated work vehicle. The chassis angle measurement device 310 generates a chassis angle measurement signal 635 that is representative of an angle of the chassis of the associated work vehicle 160 relative to a level condition of the chassis of the associated work vehicle.

In accordance with an implementation, the boom level control system 900 is operable to determine 710 a rate of chassis angle change 711 based on a rate of change of the chassis angle measurement signal 635, and determine 720 a rate of center frame angle change 721 based on a rate of change of the center frame angle measurement signal 632. It is to be appreciated that the determining 630 the compensating signal 640 comprises determining the compensating signal based on a combination of the rate of chassis angle change 711 and the rate of center frame angle change 721.

Further in accordance with an implementation, the boom level control system 900 is operable to determine 730 a lift arm flex value 731 based on a difference between the angle of the chassis of the associated work vehicle 635 and the angle of the center frame support structure 632, wherein the lift arm flex value 731 is representative of amount of inherent flex in a lift arm mounting arrangement 120 coupling the center frame support structure 113 with the associated work vehicle 160. In accordance with an implementation, the determining 630 the compensating signal 640 comprises determining the compensating signal based on a combination of the rate of chassis angle change 711, the rate of center frame angle change 721, and the determined lift arm flex value 731.

Still further in accordance with an implementation, the boom level control system 900 is operable to determine 740 a lift arm flex rate of change 741 based on a rate of change of the determined lift arm flex value 731, wherein the determining 630 the compensating signal 640 comprises determining the compensating signal based on a combination of the rate of chassis angle change 711, the rate of center frame angle change 721, the determined lift arm flex value 731, and the determined lift arm flex rate of change 741.

FIG. 8 is a functional flow diagram 800 illustrating a functional flow of a method for controlling the level relative to ground of moveable wings in the spray system carried on the work vehicle of FIGS. 4A, 4B, and 5A-5D according to an implementation of the present disclosure.

As described a center frame angle measurement signal 632 is generated using a first angle measuring device 200 disposed on the center frame support structure 113, wherein the center frame angle measurement signal is representative of an angle of the center frame support structure relative to a level condition of the center frame support structure. Also, a vehicle angle measurement signal 634 is generated using a second angle measuring device 300 disposed on the associated work vehicle, wherein the vehicle angle measurement signal is representative of an angle of the associated agricultural work vehicle 160 relative to a level condition of the associated work vehicle. The second angle measuring device 300 disposed on the associated work vehicle is in the example implementation an axle angle measurement device 312 disposed on an axle 130 of the associated work vehicle. The axle angle measurement device 312 generates an axle measurement signal 637 that is representative of an angle of the axle 130 of the associated work vehicle 160 relative to a level condition of the axle 130 of the associated work vehicle.

In accordance with an implementation, the boom level control system 900 is operable to determine 810 an rate of axle angle change 811 based on a rate of change of the axle angle measurement signal 637, and determine 820 a rate of center frame angle change 821 based on a rate of change of the center frame angle measurement signal 632. It is to be appreciated that the determining 630 the compensating signal 640 comprises determining the compensating signal based on a combination of the rate of axle angle change 811 and the rate of center frame angle change 821.

Further in accordance with an implementation, the boom level control system 900 is operable to determine 830 a chassis flex value 831 based on a difference between the angle of the axle 130 of the associated work vehicle 637 and the angle of the center frame support structure 632, wherein the chassis flex value 831 is representative of an amount of inherent flex in the associated vehicle between the axle 122 of the associated work vehicle and the center frame support structure 113. On accordance with an implementation, the determining 630 the compensating signal 640 comprises determining the compensating signal based on a combination of the rate of axle angle change 811, the rate of center frame angle change 821, and the determined chassis flex value 831.

Still further in accordance with an implementation, the boom level control system 900 is operable to determining 840 a chassis flex rate of change 841 based on a rate of change of the determined chassis flex value 831, wherein the determining the compensating signal comprises determining the compensating signal based on a combination of the rate of axle angle change 811, the rate of center frame angle change 821, the determined chassis flex value 831, and the determined chassis flex rate of change 841.

FIG. 9 is a block diagram that illustrates a control system 900 according to the example embodiments. The representative control system 900 according to the example embodiments comprises a controller 912 that includes a bus 902 or other communication mechanism for communicating information, and a processor device 904 coupled with the bus for processing information. The controller 912 further includes a main non-transitory memory device 910 that may comprise one or more memory portions or components or collection of other devices such as random access memory (RAM) 906 or other dynamic storage device for storing information and instructions to be executed by the processor device 904 and read only memory (ROM) 908 or other static storage device for storing static information and instructions for the processor device 904. The memory device 910 is also suitably provided for storing sprayer boom level control logic 911 comprising instructions for execution by the processor device, and other information including for example data and instructions for execution by the processor device for controlling the level relative to ground of the moveable wings in spray systems mounted to a common center frame support structure attached to an associated work vehicle. The controller 912 of the control system 900 is suitable for executing embodiments of one or more software systems or logic modules that perform a method of controlling the movement of the sprayer wings.

The memory device 910 may further store a set of boom level control parameters 912 stored in the memory device, wherein the boom level control logic 911 is executable by the processor device to generate the command signal for controlling the movement of the sprayer wings based on the set of boom level control parameters 912.

The example embodiments described herein are related to the apparatus or controller 912 performing a method of controlling the level relative to ground of the moveable wings in spray systems that include the moveable wings mounted to a common center frame support structure attached to an associated work vehicle to form a pair of opposed independently moveable wings extending laterally from the associated work vehicle.

According to one implementation, control of the movement of the sprayer wings is provided by the apparatus or controller 912 in response to the processor device 904 executing the control logic 911 comprising one or more sequences of instructions of logic modules contained in main memory 906. Such instructions may be read into main memory 906 from another computer-readable medium, such as storage device 910. Execution of the sequences of the sprayer boom level control logic 911 instructions contained in storage device 910 and/or main memory 906 causes the processor device 904 to perform the process steps described herein. In an alternative implementation, hard-wired circuitry may be used in place of or in combination with software instructions to implement the example embodiments. Thus, implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing sprayer boom level control logic 911 instructions to the processor device 904 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read. The terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In addition, and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor device, a discrete logic (e.g., ASIC), an analog circuit, a digital circuit, a programmed logic device, a memory device containing instructions, and so on. Logic may include one or more gates, combinations of gates, or other circuit components.

The control apparatus or controller 900 further includes a communication interface 918 coupled with the bus 902 which provides a two-way data communication coupling to a network link 920 that is connected to local network 912 such as for example a local network of the work vehicle 160 such as a Controller Area Network (CAN) bus or the like. The communication interface 918 may be a controller area network (CAN) card to provide a data communication connection to a compatible CAN bus. As another example, communication interface 918 may be a local area network (LAN) card to provide a data communication connection to a compatible LAN. For example, communication interface 918 may be an integrated services digital network (ISDN) card or a modem to provide a data communication connection to a corresponding type of telephone line. Wireless links may also be implemented. In any such implementation, communication interface 918 may be a wireless receiver/transmitter, i.e. a transceiver operable to send and receive electrical, electromagnetic, radio frequency (RF), and/or optical signals that carry data streams such as digital data streams representing various types of information.

Network link 920 typically provides data communication through one or more networks to other data devices. For example, network link 920 may provide a connection through a local network to a diagnostic host computer (not shown) of the like for supporting configuration of the system as desired or necessary. An Internet Service Provider (ISP) 926 may provide data communication services indirectly through the Internet via the network 912 or directly through the network link 920.

The example control apparatus or controller 900 can send messages and receive data, including program code, through the network(s), network link 920 and communication interface 918. In an Internet-connected example embodiment, the control apparatus or controller 900 is operatively connected with a plurality of external public, private, governmental, or commercial servers (not shown) configured to execute a web application in accordance with example embodiments.

The memory device 910 includes database 913 storing a plurality of sets of predetermined values. In this regard, in one aspect of this disclosure, the database may store one or more offset values for tuning the sensors 141, 142, 200, 300, 310, and 312.

It is to be understood that other embodiments will be utilized and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible in light of the above teachings. It is therefore intended that the scope of the claims not be limited by this detailed description.

The invention claimed is:

1. A boom level control method for generating a signal for controlling the level relative to ground of moveable wings in a spray system that includes the moveable wings mounted to a common center frame support structure attached to an associated work vehicle to form a pair of opposed independently moveable wings extending laterally from the associated work vehicle, the method comprising:

determining, using at least one distance sensor, an initial control signal to move the moveable wings based on positions of the moveable wings relative to the ground;

determining, using at least one angle measuring device, a compensating signal for the initial control signal, wherein the compensating signal is derived independently from the position of the moveable wings relative to the ground and includes a flexure component dependent upon one or more flexural properties of the associated work vehicle;

generating a level control output signal based on a combination of the initial control signal and the compensating signal; and controlling the level of the movable wings using the level control output signal.

2. The method according to claim 1, wherein:

the determining the initial control signal comprises:

generating a first distance signal using a first distance sensor disposed on a first wing of the spray system, wherein the first distance signal is representative of a first distance between the first wing and the ground;

generating a second distance signal using a second distance sensor disposed on a second wing of the spray system, wherein the second distance signal is representative of a second distance between the second wing and the ground; and determining the initial control signal based on a combination of the first and second distance signals; and the determining the compensating signal comprises:

generating a center frame angle measurement signal using a first angle measuring device disposed on the center frame support structure, wherein the center frame angle measurement signal is representative of an angle of the center frame support structure relative to a level condition of the center frame support structure;

generating a vehicle angle measurement signal using a second angle measuring device disposed on the associated work vehicle, wherein the vehicle angle measurement signal is representative of an angle of the associated work vehicle relative to a level condition of the associated work vehicle; and determining the compensating signal based on a combination of the center frame angle measurement signal and the vehicle angle measurement signal.

3. The method according to claim 2, wherein:

the generating the vehicle angle measurement signal comprises generating a chassis angle measurement signal using a chassis angle measurement device disposed on a chassis of the associated work vehicle, wherein the vehicle angle measurement signal is representative of an angle of the chassis of the associated work vehicle relative to a level condition of the chassis of the associated work vehicle; and the determining the compensating signal comprises determining the compensating signal based on a combination of the center frame angle measurement signal and the chassis angle measurement signal.

4. The method according to claim 3, further comprising:

determining a rate of chassis angle change based on a rate of change of the chassis angle measurement signal; and determining a rate of center frame angle change based on a rate of change of the center frame angle measurement signal, wherein the determining the compensating signal comprises determining the compensating signal based on a combination of the rate of chassis angle change and the rate of center frame angle change.

5. The method according to claim 4, further comprising:

determining a lift arm flex value based on a difference between the chassis angle measurement signal and the center frame angle measurement signal, wherein the lift arm flex value is representative of amount of inherent flex in a lift arm mounting arrangement coupling the center frame support structure with the associated work vehicle, wherein the determining the compensating signal comprises determining the compensating signal based on a combination of the rate of chassis angle change, the rate of center frame angle change, and the determined lift arm flex value.

6. The method according to claim 5, further comprising:

determining a lift arm flex rate of change based on a rate of change of the determined lift arm flex value, wherein the determining the compensating signal comprises determining the compensating signal based on a combination of the rate of chassis angle change, the rate of center frame angle change, the determined lift arm flex value, and the determined lift arm flex rate of change.

7. The method according to claim 2, wherein:

the generating the vehicle angle measurement signal comprises generating an axle angle measurement signal using an axle angle measurement device disposed on an axle of the associated work vehicle, wherein the axle angle measurement signal is representative of an angle of the axle of the associated work vehicle relative to a level condition of the axle of the associated work vehicle; and the determining the compensating signal comprises determining the compensating signal based on a combination of the center frame angle measurement signal and the axle angle measurement signal.

8. The method according to claim 7, further comprising: determining a rate of axle angle change based on a rate of change of the axle angle measurement signal; and determining a rate of center frame angle change based on a rate of change of the center frame angle measurement signal, wherein the determining the compensating signal comprises determining the compensating signal based on a combination of the rate of axle angle change and the rate of center frame angle change.

9. The method according to claim 8, further comprising: determining a chassis flex value based on a difference between the angle of the axle of the associated work vehicle and the angle of the center frame support structure, wherein the chassis flex value is representative of an amount of inherent flex in the associated vehicle between the axle of the associated work vehicle and the center frame support structure, wherein the determining the compensating signal comprises determining the compensating signal based on a combination of the rate of axle angle change, the rate of center frame angle change, and the determined chassis flex value.

10. The method according to claim 9, further comprising: determining a chassis flex rate of change based on a rate of change of the determined chassis flex value, wherein the determining the compensating signal comprises determining the compensating signal based on a combination of the rate of axle angle change, the rate of center frame angle change, the determined chassis flex value, and the determined chassis flex rate of change.

11. A boom level control system for generating a signal for controlling the level relative to ground of moveable wings in a spray system that includes the moveable wings mounted to a common center frame support structure attached to an associated work vehicle to form a pair of opposed independently moveable wings extending laterally from the associated work vehicle, the system comprising:

a control unit comprising:

a processor device;

a non-transitory memory device operatively coupled with the processor device; and sprayer boom level control logic stored in the memory device, wherein the processor device is operable to execute the sprayer boom level control logic to:

determine an initial control signal to move the moveable wings based on positions of the moveable wings relative to the ground;

determine a compensating signal for the initial control signal, wherein the compensating signal is derived independently from the position of the moveable wings relative to ground and includes a flexure component dependent upon one or more flexural properties of the associated work vehicle;

generate a level control output signal for controlling the level of the moveable wings based on a combination of the initial control signal and the compensating signal; and control the level of the movable wings using the level control output signal.

12. The control system according to claim 11, further comprising:

a first distance sensor disposed on a first wing of the spray system, the first distance sensor being operable to generate a first distance signal representative of a distance between the first wing and the ground;

a second distance sensor disposed on a second wing of the spray system, the second distance sensor being operable to generate a second distance signal representative of a distance between the second wing and the ground;

a first angle measuring device disposed on the center frame support structure, the first angle measuring device being operable to generate a center frame angle measurement signal that is representative of an angle of the center frame support structure relative to a level condition of the center frame support structure; and a second angle measuring device disposed at a selected position on the associated work vehicle, the second angle measuring device being operable to generate a vehicle angle measurement signal that is representative of an angle of the associated work vehicle relative to a level condition of the associated work vehicle, wherein the processor device is operable to execute the sprayer boom level control logic to determine the initial control signal based on a combination of the first and second distance signals, wherein the processor device is operable to execute the sprayer boom level control logic to determine the compensating signal based on a combination of the center frame angle measurement signal and the vehicle angle measurement signal.

13. The control system according to claim 12, further comprising:

an axle angle measurement device disposed on an axle of the associated work vehicle, wherein the axle angle measurement device is operable to generate an axle angle measurement signal as the vehicle angle measurement signal, wherein the axle angle measurement signal is representative of an angle of the axle of the associated work vehicle relative to a level condition of the axle of the associated work vehicle, wherein the processor device is operable to execute the sprayer boom level control logic to determine the compensating signal based on a combination of the center frame angle measurement signal and the axle angle measurement signal.

14. The control system according to claim 13, wherein the processor device is operable to execute the sprayer boom level control logic to:

determine a rate of axle angle change based on a rate of change of the axle angle measurement signal;

determine a rate of center frame angle change based on a rate of change of the center frame angle measurement signal;

determine a chassis flex value based on a difference between the angle of the axle of the associated work vehicle and the angle of the center frame support structure, wherein the chassis flex value is representative of an amount of inherent flex in the associated vehicle between the axle of the associated work vehicle and the center frame support structure;

determine a chassis flex rate of change based on a rate of change of the determined chassis flex value; and determine the compensating signal based on a combination of the rate of axle angle change, the rate of center frame angle change, the determined chassis flex value, and the determined chassis flex rate of change.

15. The control system according to claim 12, further comprising:

a chassis angle measurement device disposed on a chassis of the associated work vehicle, the chassis angle measurement device being operable to generate a chassis angle measurement signal as the vehicle angle measurement signal, wherein the chassis angle measurement signal is representative of an angle of the chassis of the associated work vehicle relative to a level condition of the chassis of the associated work vehicle, wherein the processor device is operable to execute the sprayer boom level control logic to determine the compensating signal based on a combination of the center frame angle measurement signal and the chassis angle measurement signal.

16. The control system according to claim 15, wherein the processor device is operable to execute the sprayer boom level control logic to:

determine a rate of chassis angle change based on a rate of change of the chassis angle measurement signal;

determine a rate of center frame angle change based on a rate of change of the center frame angle measurement signal; and determine the compensating signal based on a combination of the rate of chassis angle change and the rate of center frame angle change.

17. The control system according to claim 16, wherein the processor device is operable to execute the sprayer boom level control logic to:

determine a lift arm flex value based on a difference between the chassis angle measurement signal and the center frame angle measurement signal, wherein the lift arm flex value is representative of amount of inherent flex in a lift arm mounting arrangement coupling the center frame support structure with the associated work vehicle; and determine the compensating signal based on a combination of the rate of chassis angle change, the rate of center frame angle change, and the determined lift arm flex value.

18. The control system according to claim 17, wherein the processor device is operable to execute the sprayer boom level control logic to:

determine a lift arm flex rate of change based on a rate of change of the determined lift arm flex value; and determine the compensating signal based on a combination of the rate of chassis angle change, the rate of center frame angle change, the determined lift arm flex value, and the determined lift arm flex rate of change.

19. A non-transitory computer readable medium comprising instructions that, when executed by at least one processor device, cause the at least one processor device to perform a method of controlling the level relative to ground of moveable wings in a spray system that includes the moveable wings mounted to a common center frame support structure attached to an associated work vehicle to form a pair of opposed independently moveable wings extending laterally from the associated work vehicle, the method comprising:

determining, based on signals received from one or more distance sensors, an initial control signal to move the moveable wings based on positions of the moveable wings relative to the ground;

determining, based on signals received from one or more angle measuring devices, a compensating signal for the initial control signal, wherein the compensating signal is derived independently from the position of the moveable wings relative to the ground and includes a flexure component dependent upon one or more flexural properties of the associated work vehicle;

generating a level control output signal based on a combination of the initial control signal and the compensating signal; and controlling the level of the moveable wings using the level control output signal.

20. The non-transitory computer readable medium according to claim 19, wherein:

the determining the initial control signal comprises:

receiving a first distance signal from a first distance sensor disposed on a first wing of the spray system, wherein the first distance signal is representative of a first distance between the first wing and the ground;

receiving a second distance signal from a second distance sensor disposed on a second wing of the spray system, wherein the second distance signal is representative of a second distance between the second wing and the ground; and determining the initial control signal based on a combination of the first and second distance signals; and the determining the compensating signal comprises:

receiving a center frame angle measurement signal from a first angle measuring device disposed on the center frame support structure, wherein the center frame angle measurement signal is representative of an angle of the center frame support structure relative to a level condition of the center frame support structure;

receiving a vehicle angle measurement signal from a second angle measuring device disposed on the associated work vehicle, wherein the vehicle angle measurement signal is representative of an angle of the associated work vehicle relative to a level condition of the associated work vehicle; and determining the compensating signal based on a combination of the center frame angle measurement signal and the vehicle angle measurement signal.

* * * * *